(12) United States Patent
Cote

(10) Patent No.: US 9,526,232 B2
(45) Date of Patent: Dec. 27, 2016

(54) SQUIRREL PROOF SUSPENDED BIRD FEEDER

(71) Applicant: PLC Patents and Trade Marks Inc., Lac Brome (CA)

(72) Inventor: Paul L. Cote, Lac Brome (CA)

( * ) Notice: Subject to any disclaimer, the term of this patent is extended or adjusted under 35 U.S.C. 154(b) by 98 days.

(21) Appl. No.: 14/544,998

(22) Filed: Mar. 13, 2015

(65) Prior Publication Data

US 2016/0262357 A1    Sep. 15, 2016

(51) Int. Cl.
| | |
|---|---|
| *A01K 61/02* | (2006.01) |
| *A01K 39/01* | (2006.01) |
| *A01K 39/012* | (2006.01) |
| *A01K 39/014* | (2006.01) |

(52) U.S. Cl.
CPC ......... *A01K 39/0113* (2013.01); *A01K 39/012* (2013.01); *A01K 39/014* (2013.01)

(58) Field of Classification Search
CPC ............................ A01K 39/0113; A01K 39/00
USPC ................................................ 119/52.4, 52.3
See application file for complete search history.

(56) References Cited

U.S. PATENT DOCUMENTS

| | | | | |
|---|---|---|---|---|
| RE32,970 E | * | 7/1989 | Furlani ............... | A01K 39/0113 119/52.3 |
| 5,195,459 A | * | 3/1993 | Ancketill ........... | A01K 39/0113 119/52.3 |
| 6,918,353 B1 | * | 7/2005 | Coroneos ........... | A01K 39/0113 119/52.3 |
| 7,739,982 B2 | * | 6/2010 | Cote .................. | A01K 39/0113 119/52.2 |
| 8,434,425 B2 | * | 5/2013 | Cote .................. | A01K 39/0113 119/52.3 |
| 2012/0073505 A1 | * | 3/2012 | Cote .................. | A01K 39/0113 119/51.03 |

* cited by examiner

*Primary Examiner* — Kristen C Hayes
(74) *Attorney, Agent, or Firm* — Eric Fincham

(57) ABSTRACT

A squirrel proof bird feeder comprising a seed container having a seed tray located at the outlet so as to receive seeds from the seed container, a shroud extending about the seed tray, a cover attached to the shroud, an upper ring housing secured to an upper end of the seed container, the upper ring housing having a central portion located within the seed container, a rod located within the central portion, the rod having a first end secured to the central portion and a second end extending through the cover for hanging the bird feeder, a compression spring extending about the rod, the compression spring having a lower end biased against a lower stopper and an upper end biased against an upper stopper such that a predetermined weight on the shroud will compress the spring and cause the shroud to move downwardly.

13 Claims, 16 Drawing Sheets

SQUIRREL PROOF SUSPENDED BIRD FEEDER

FIELD OF THE INVENTION

The present invention relates to bird feeders, and more particularly, relates to a squirrel proof tube type bird feeder which is relatively inexpensive and which can be pre-adjusted such that different size marauders may be excluded from accessing the feed.

BACKGROUND OF THE INVENTION

The use of bird feeders is well known and they are popular in many countries, particularly in North America. The object of the bird feeders is to attract birds of a desired species to the feeder where they can be visually admired. At the same time, certain marauders are considered undesirable and accordingly, it is desirable to prevent these marauders from accessing the feed in the bird feeder. Such marauders could include, for example, crows, grackles, squirrels, etc. Squirrels are a particularly big problem since they will consume a large quantity of feed necessitating frequent refilling of the bird feeder.

There have been many attempts to develop squirrel proof bird feeders and indeed, most of them have some degree of preventing squirrels from accessing the feed. However, some of these feeders are relatively expensive and accordingly, it would be desirable to provide a relatively inexpensive squirrel proof bird feeder.

SUMMARY OF THE INVENTION

It is an object of the present invention to provide a bird feeder which has squirrel proof qualities.

According to one aspect of the present invention, there is provided a squirrel proof bird feeder comprising a seed container, a seed tray located below the seed tube so as to receive seeds from the seed tube, a shroud extending about the seed tray, a cover attached to the shroud, an upper ring housing secured to an upper end of the seed tube, the upper ring housing having a central portion located within the seed tube, a rod located within the central portion, the rod having a first end secured to the central portion, a second end of the rod extending through the cover for hanging the bird feeder, and a spring extending about the rod, the spring having a lower end biased against a lower stopper and an upper end biased against an upper stopper, the arrangement being such that a predetermined weight on the shroud will compress the spring and the shroud will move downwardly.

The bird feeder includes a seed container which could be of any shape, but preferably comprises a seed tube of a cylindrical configuration.

The seed tray located below the seed tube is designed to receive seeds therefrom and includes a diverter to divert the seeds to the outer extremity.

The bird feeder of the present invention preferably uses a spring assembly which is designed to be factory adjusted to a precise setting. Once adjusted, this setting is locked in place. This arrangement ensures that all of the feeders will have an identical predetermined compressive strength—i.e. a given weight will cause activation of the shroud moving downwardly to cover the feed opening.

BRIEF DESCRIPTION OF THE DRAWINGS

Having thus generally described the invention, reference will be made to the accompanying drawings illustrating embodiments thereof, in which.

DETAILED DESCRIPTION OF THE INVENTION

Figure 1:
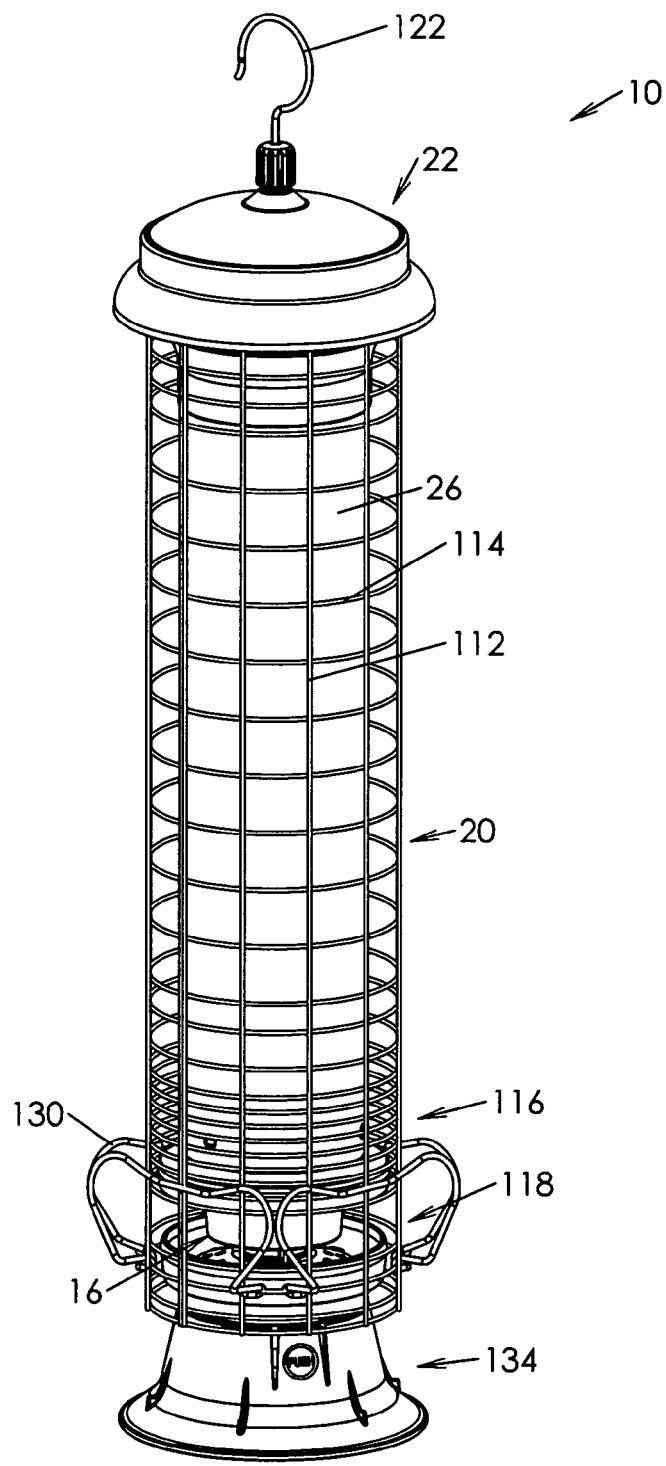
FIG. 1 is a perspective view of a bird feeder according to the present invention when the shroud is in a normal position.

Referring to the drawings in greater detail and by reference characters thereto, there is illustrated in FIG. 1 a side sectional view of a squirrel proof bird feeder and which squirrel proof bird feeder is generally designated by reference numeral 10.

Squirrel proof bird feeder 10 includes a seed container 12. In the illustrated embodiment, seed tube 10 is of a cylindrical configuration and is formed of a transparent material. However, the seed tube could also be of other configurations and likewise could be formed of a non transparent material.

Squirrel proof bird feeder 10 also includes a seed tray generally designated by reference numeral 14 and which seed tray 14 is situated below seed container 12 to receive seed therefrom. It will be understood that any seed may be that which is suitable including manufactured "seed" as is known in the industry.

The squirrel proof bird feeder also includes a bottom ring housing generally designated by reference numeral 16 and an upper ring housing generally designated by reference numeral 18, both of which will be described in greater detail hereinbelow.

The squirrel proof bird feeder 10 also includes a movable shroud 20 and a cover generally designated by reference numeral 22.

As aforementioned, seed container 12 is of a cylindrical configuration which is defined by a side wall 26. Formed within side wall 26 are a plurality of bottom or lower apertures 28 and a plurality of upper apertures 30 for reasons which will become apparent hereinbelow.

Figure 13:
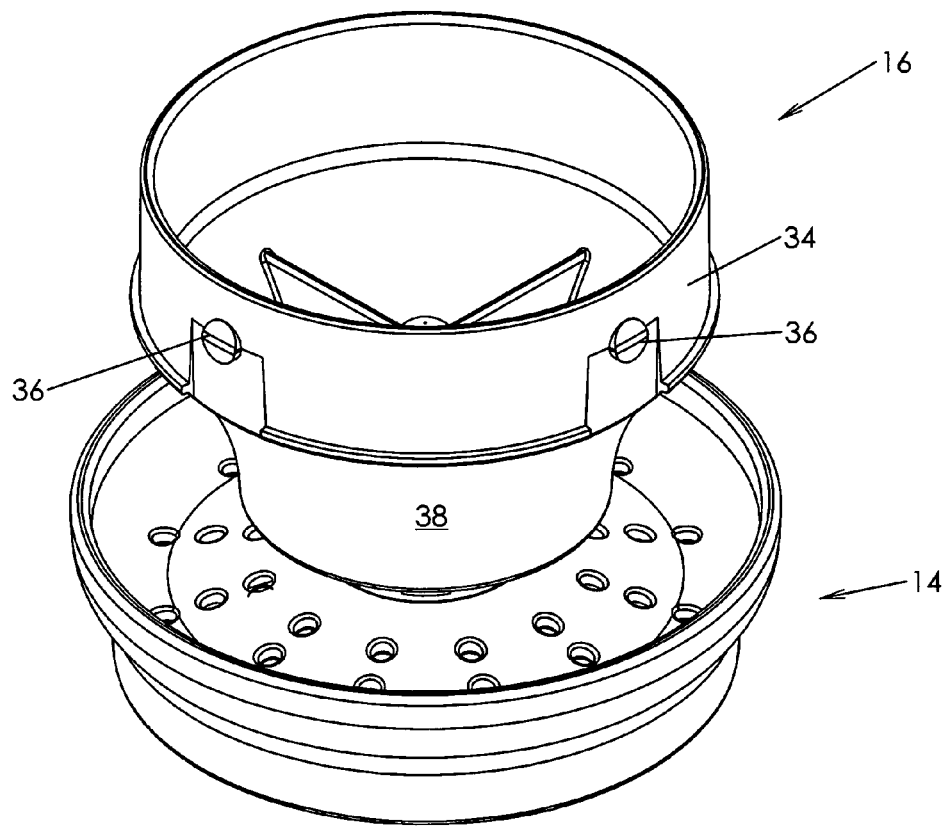
FIG. 13 is a perspective view illustrating the seed tray and bottom ring housing.
Figure 14:
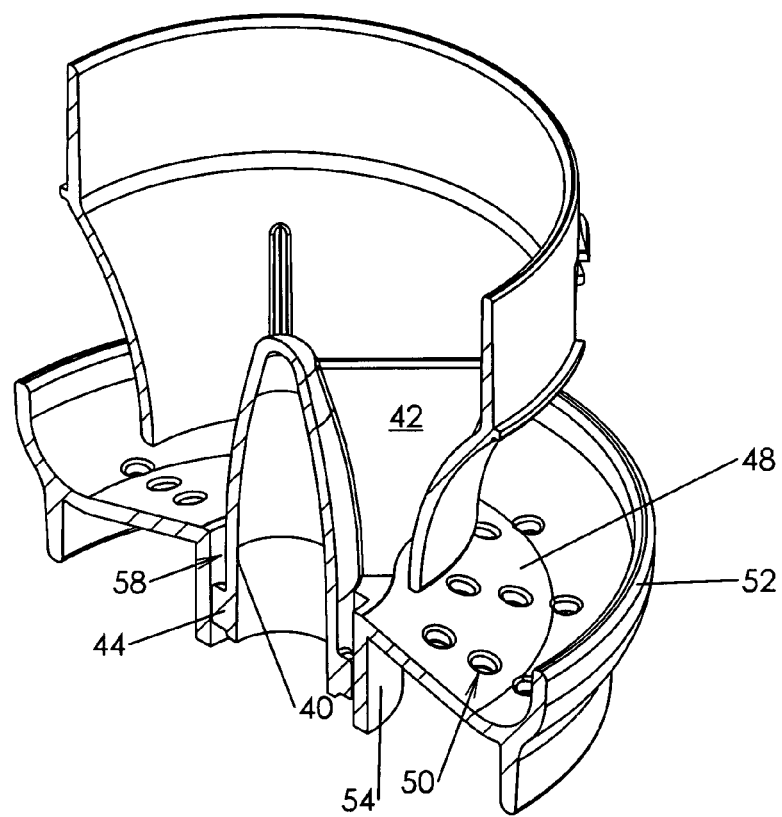
FIG. 14 is a perspective sectional view thereof.
Figure 15:
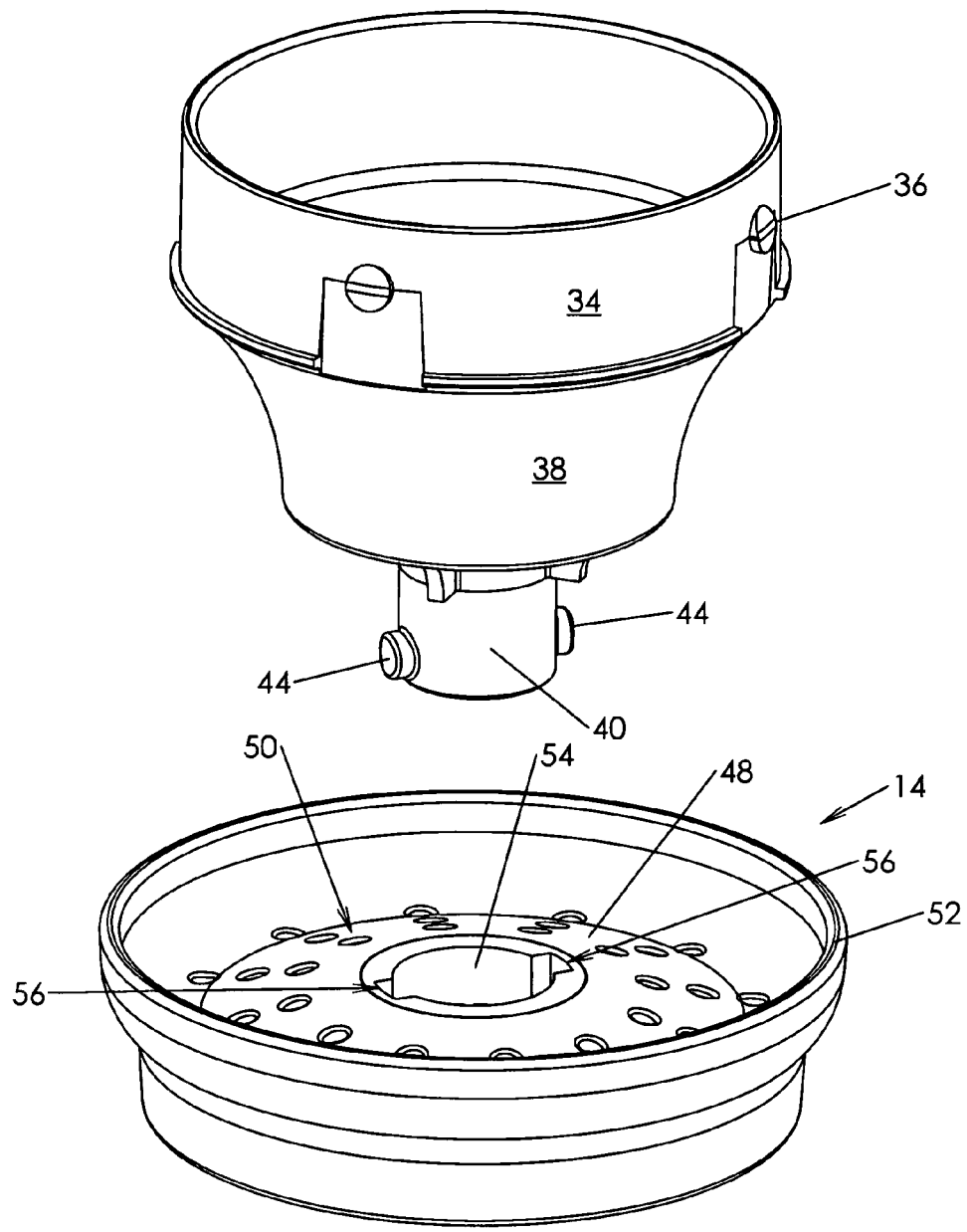
FIG. 15 is an exploded view of the bottom ring housing and seed tray.
Figure 16:
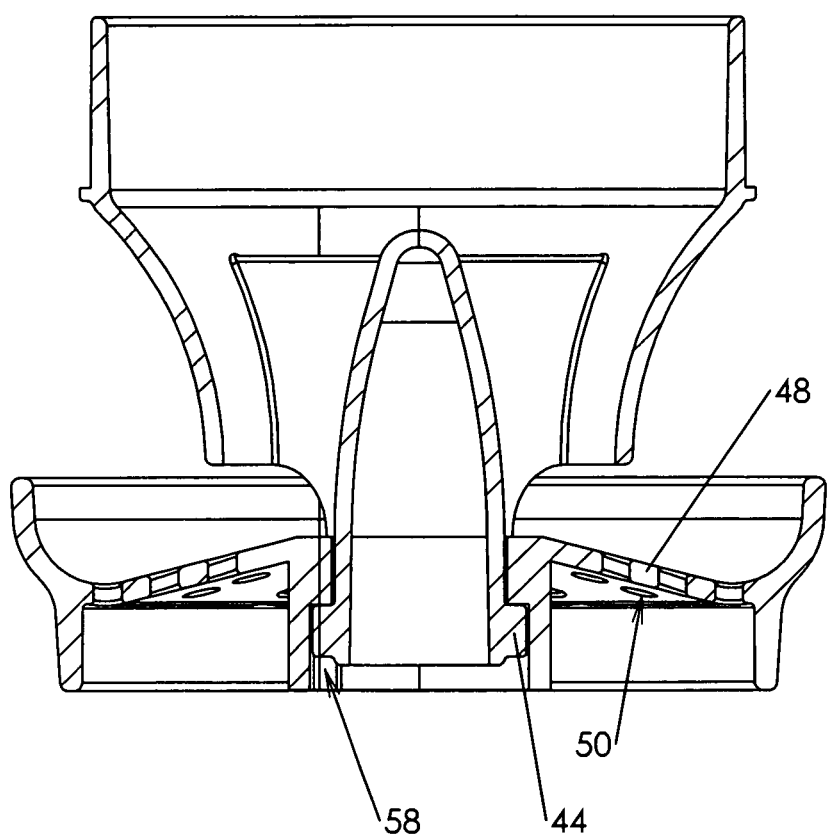
FIG. 16 is a sectional view of the arrangement of FIG. 13.

The bottom ring housing 16 is illustrated in greater detail in FIGS. 13 and 14. Bottom ring housing 16 has an upper wall 34 with a plurality of projections 36 formed on an exterior surface thereof. Projections 36 are designed to engage with bottom apertures 28 formed in side wall 26 to interconnect bottom ring housing 16 and seed container 12. As may be seen, projections 36 have a tapered surface to facilitate the placement of seed container 12 thereover. Extending from upper wall 34 is a lower tapered wall 38. Lower tapered wall 38 is designed to direct seed from seed container 12 into seed tray 14. Located inwardly of lower tapered wall 38 is a cylindrical member 40 which is connected to lower tapered wall 38 by means of flanges 42. It will be noted that there are provided two protrusions 44 on the outer facing surface of cylindrical member 40.

Seed tray 14 is also best illustrated in FIGS. 13 and 14. Seed tray 14 has a sloping bottom wall 48 which is designed to direct seeds outwardly towards a side wall 52 for ready access by the birds. Bottom wall 48 has a plurality of drainage apertures 50 formed therein.

At its central portion, seed tray 14 is provided with an aperture or opening defined by a downwardly extending inner wall 54. Formed within inner wall 54 are a plurality of keyhole slots 56. Recesses 58 communicate with key hole slots 56 such that protrusions 44 of bottom ring housing 16 may be engaged therein and one of the members rotated such that the protrusions will enter recesses 58.

On the lower surface of seed tray 14, there are provided a plurality of ribs 60 with projections 62 being located on an inner facing portion of a side wall 64.

Upper ring housing 18 has a lower outer wall 66 with an upper wall 68 being funnel shaped. This is provided in order to assist when pouring seeds into the seed container 12. Outer wall 66 has projections 70 formed thereon; projections 70 are designed to engage with upper apertures 30 on seed tube side wall 26 to secure upper ring housing 18 to seed container 12. Projections 70 have a tapered surface so as to permit the insertion thereof into seed container 12.

Upper ring housing 18 also includes a central portion 72 which is located within seed container 12. Central portion 72 is secured to upper wall 68 by means of ribs 74.

Mounted within central portion 72 is a slidable member 76. Slidable member 76 has an enlarged portion 78 located at the bottom thereof along with a top wall 79. A rod 80 extends through slidable member 76. Rod 80 has an upper threaded end 82 and a lower threaded portion 84. A reduced diameter threaded bottom portion is designated by reference numeral 86.

A nut 88 is engaged with threaded portion 84. A spring 90 surrounds rod 80. Spring 90 is biased, at its lower end, against nut 88 and biased at its upper end against the interior of top wall 79.

A nut retainer generally designated by reference numeral 92 has a hexagonal wall 94 which is designed to receive nut 88 and retain the same in a fixed position. Nut retainer 92 has snap elements 96 which engage with snap retainers 98 on upper ring housing 18. Nut retainer 92 has a bottom wall which is apertured to provide drainage. A second nut 102 is screwthreadedly engaged with reduced diameter threaded bottom portion 86. In the preferred embodiment, the inner assembly can be tested at the factory to determine the compressive strength of spring 90. This is important since although all springs are designed to be relatively consistent, different compressive strengths can appear. Accordingly, when the compressive strength of spring 90 is tested, it can be adjusted through relative rotation of nut 88 and threaded portion 84. When the correct compressive strength is reached, second nut 102 may be utilized to lock the setting in place.

Cover 22 has a top wall 104, a side wall 106 and a sloping drainage wall 108. Shroud 20 extends about seed tray 14. Shroud 20 is comprised of a plurality of vertical wires 112 with horizontal wire loops 114 secured thereto typically by welding. It will be noted that there is provided an area 116 wherein the horizontal wires are spaced close together to prevent a marauder gaining access to seed tray 14. In normal use, a further spacing provides a permitted access area generally designated by reference numeral 118. A hook 122 is used to hang bird feeder 10. Hook 122 is maintained in position by means of a threaded attachment 124 through which hook 122 passes. A gasket 126 is provided at an enlarged portion.

Figure 2:
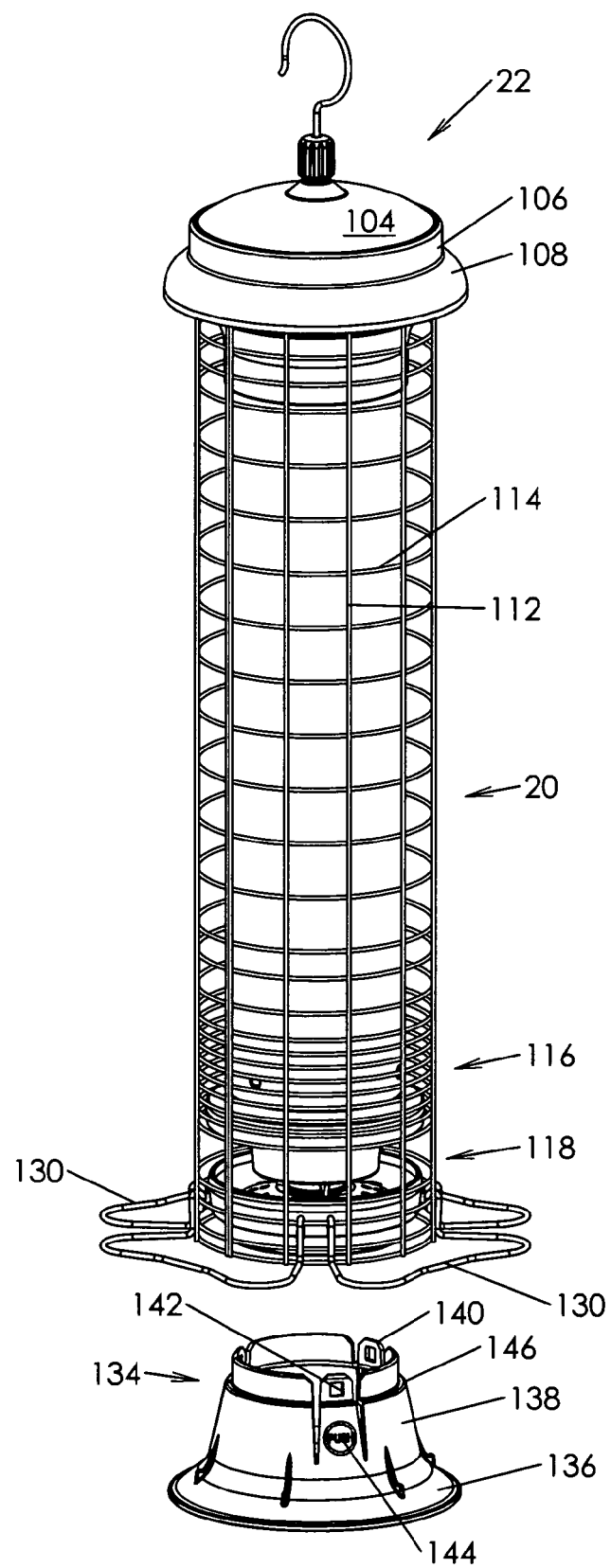
FIG. 2 is a perspective view showing separation of the stand.
Figure 3:
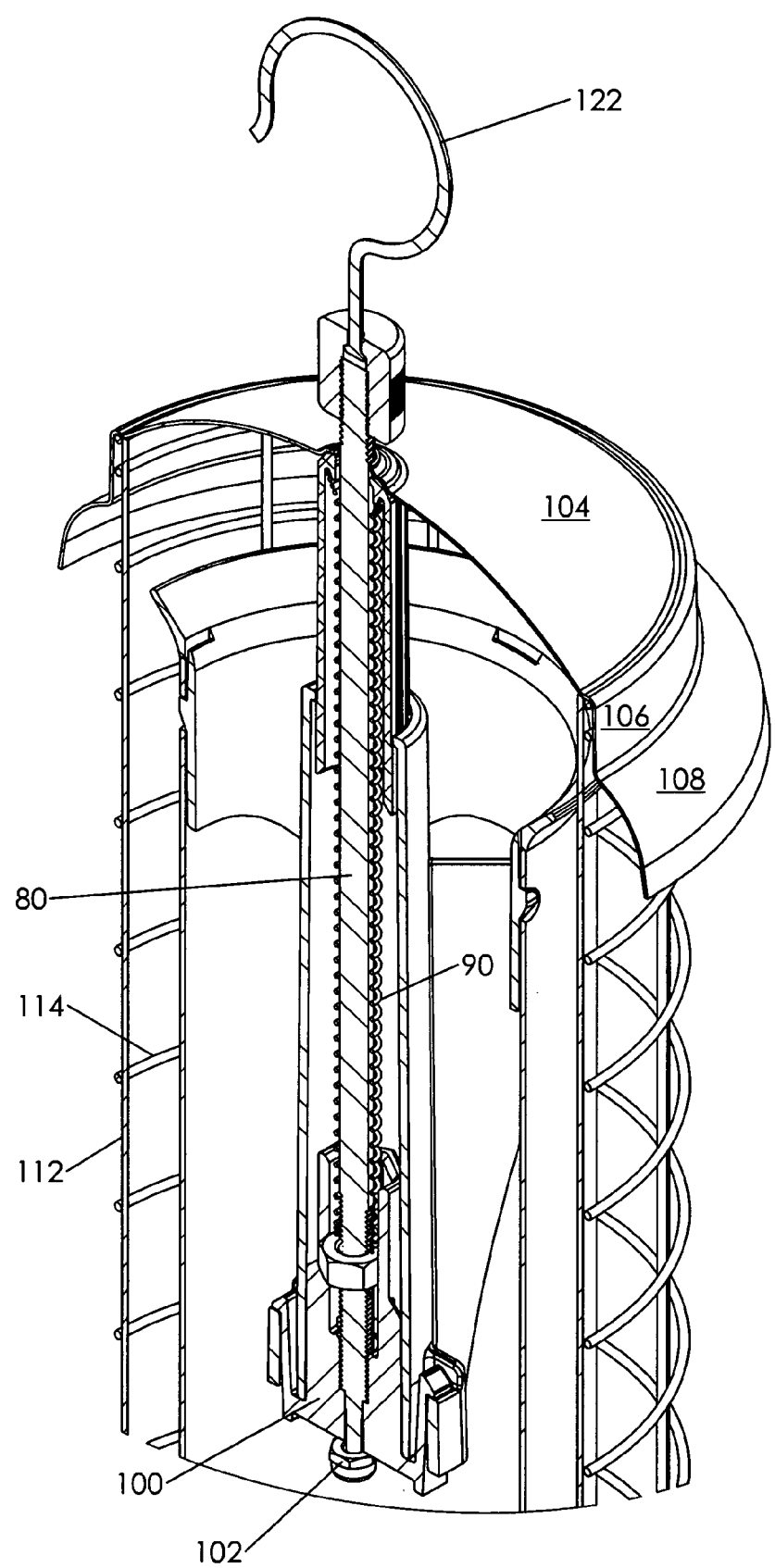
FIG. 3 is an enlarged view of the upper portion of the bird feeder of FIG. 2.

The bird feeder 10 also includes a plurality of perches 130 which are secured to shroud 20 by means of hooks 132. Thus, the perches 130 may be rotated as shown in FIG. 1 from a position wherein the bird feeder is packaged to the position shown in FIG. 2.

In use, the seed container 26 may be filled with a bird feed. Any weight on either cover 22 or shroud 20 will cause the shroud to move downwardly such that closer spacing area 116 will cover the opening to the seed tray.

In other words, under normal conditions, access area 118 allows the birds' access to the feed while a downward movement of the shroud will deny access to the feed.

Figure 4:
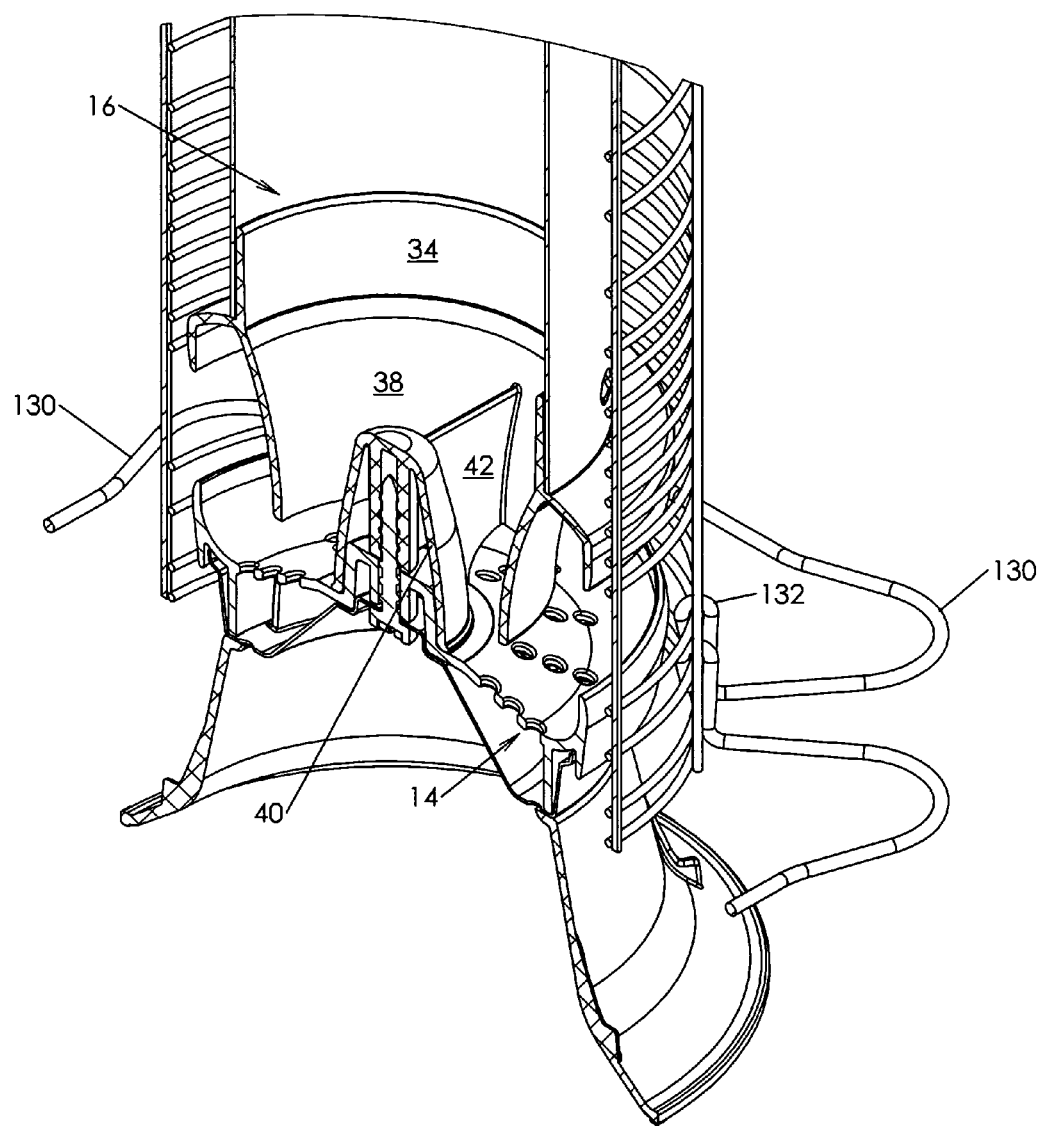
FIG. 4 is an enlarged view of the bottom portion of the bird feeder of FIG. 2.
Figure 5:
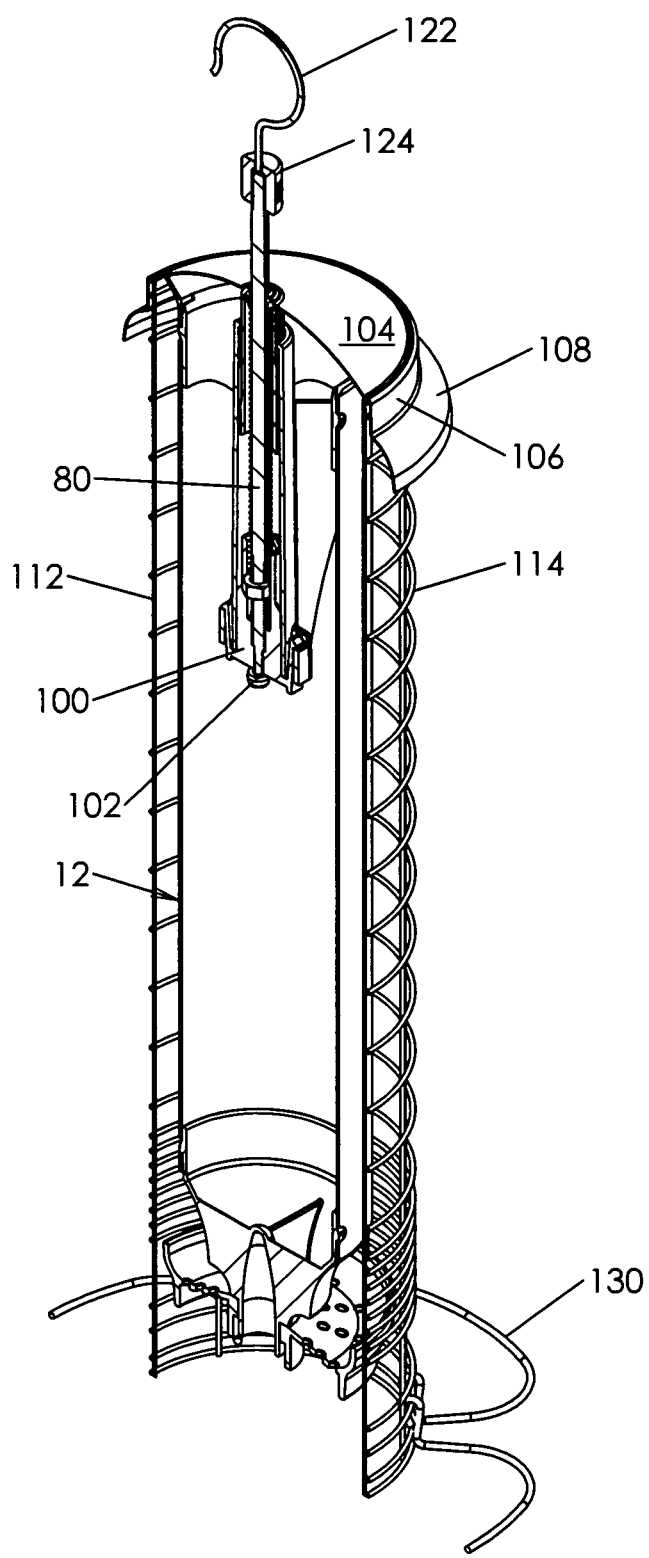
FIG. 5 is a perspective sectional view of the bird feeder.
Figure 6:
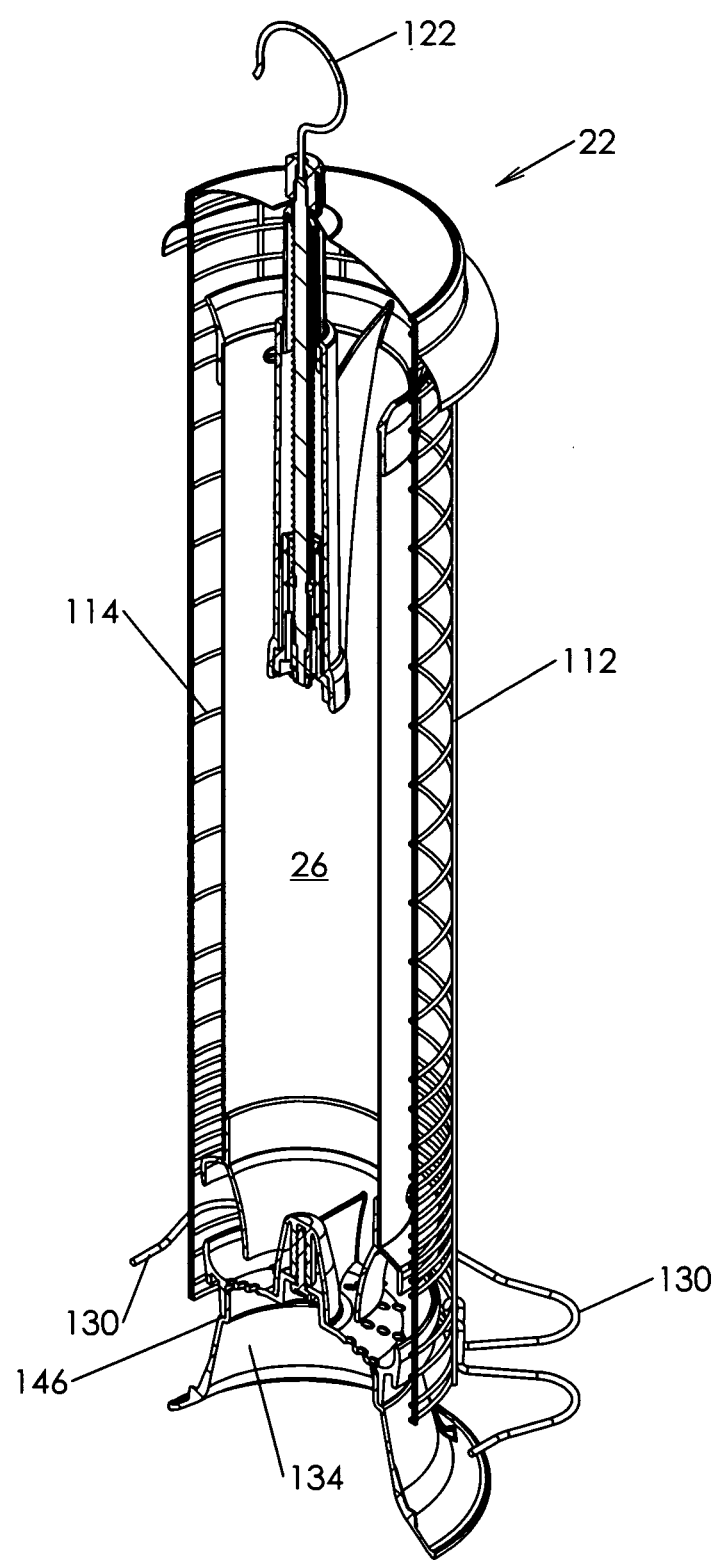
FIG. 6 is a perspective sectional view of the feeder having a stand.
Figure 7:
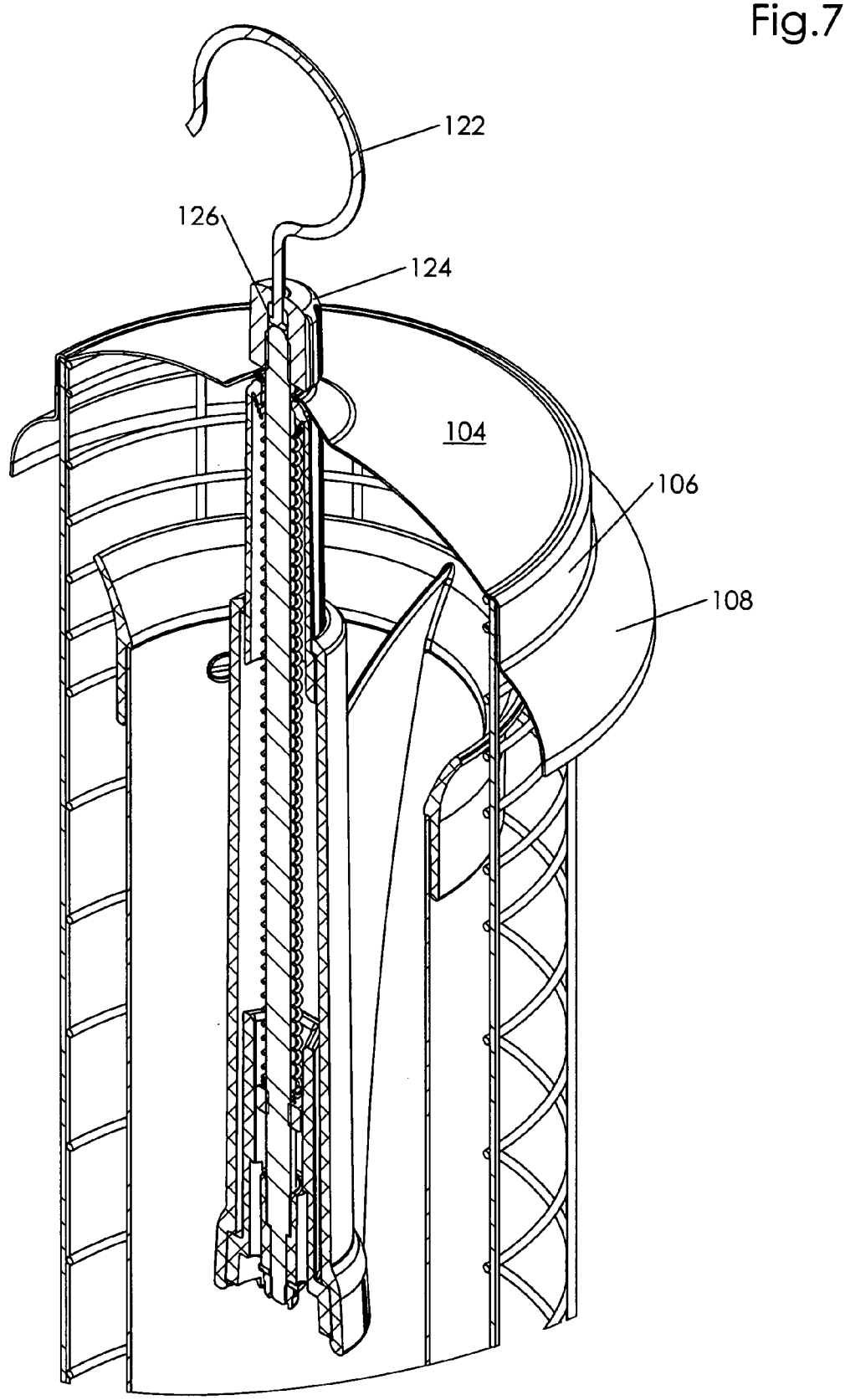
FIG. 7 is a an enlarged view of the upper portion of the bird feeder of FIG. 6.
Figure 8:
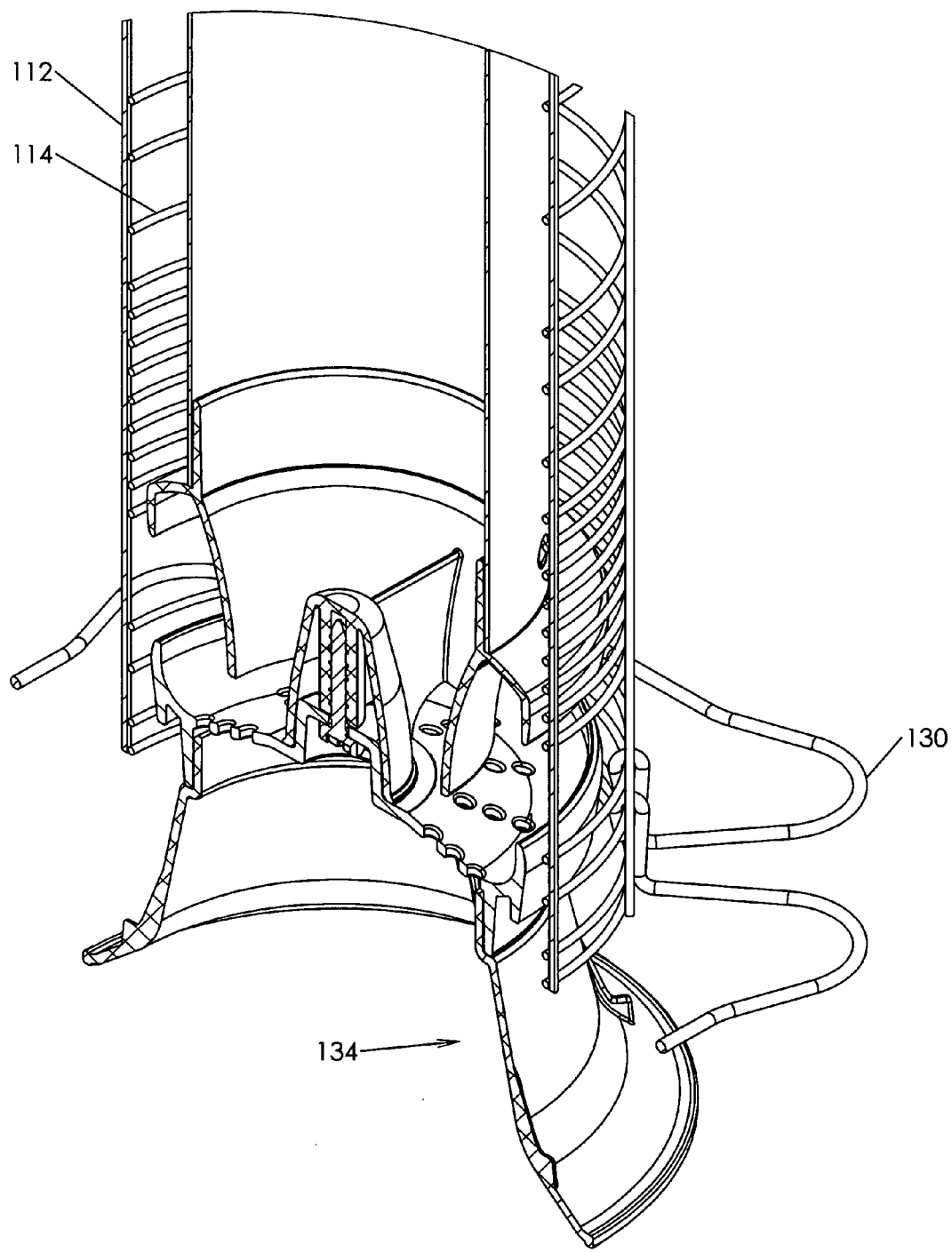
FIG. 8 is an enlarged view of the bottom portion of the feeder of FIG. 6.
Figure 9:
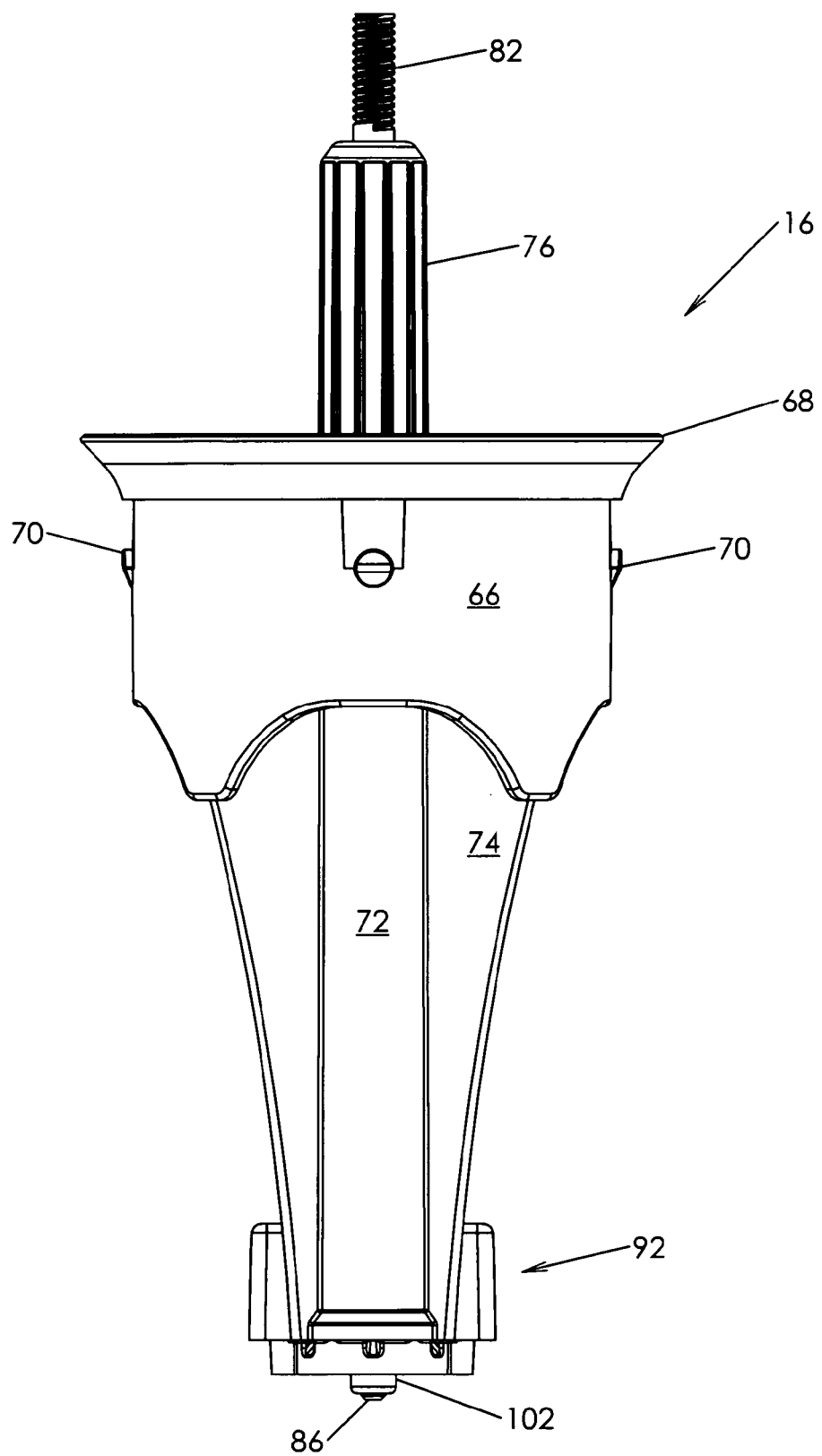
FIG. 9 is a side elevational view of the outside of the spring mechanism.
Figure 10:
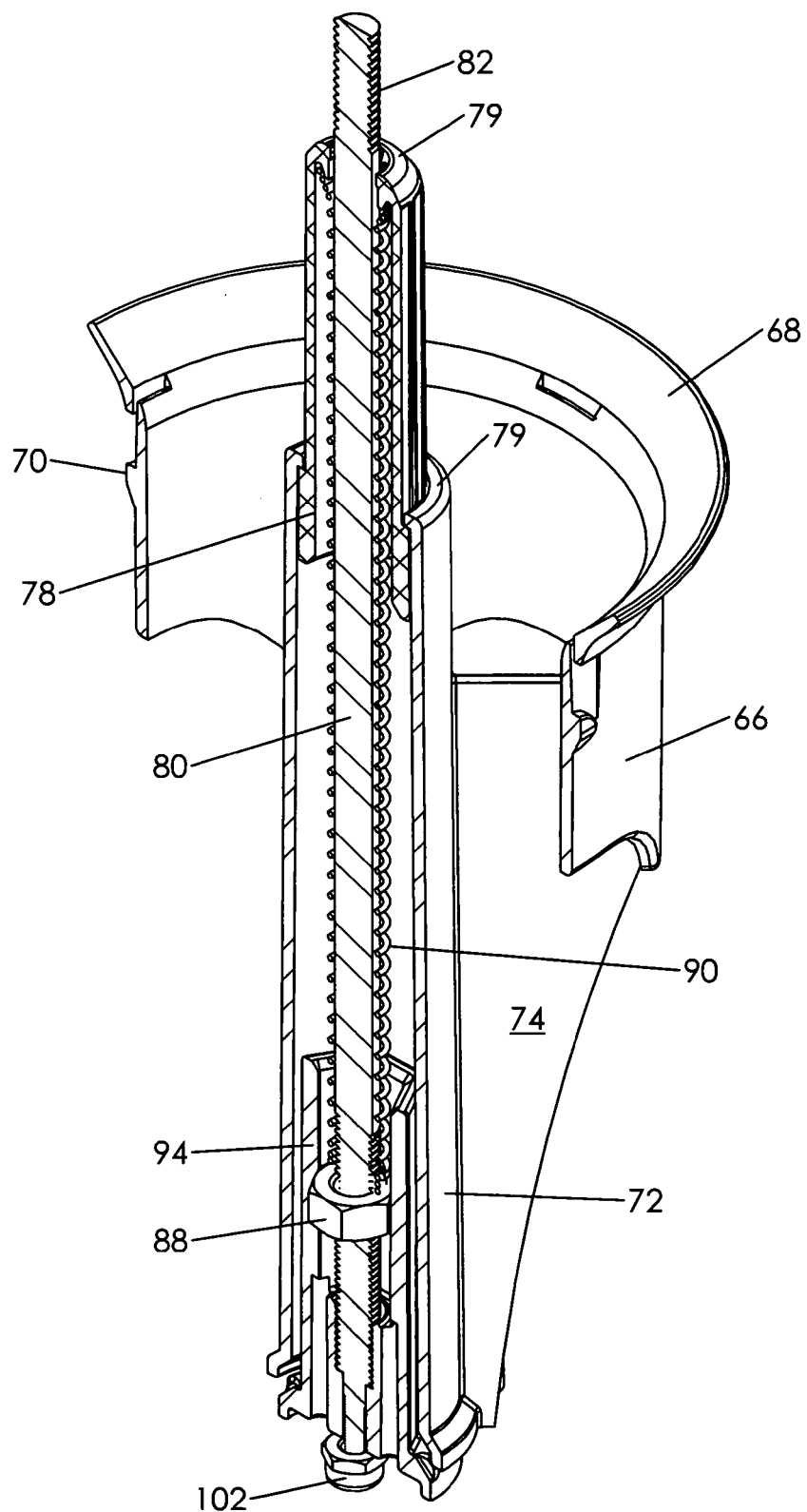
FIG. 10 is an enlarged perspective sectional view of the spring mechanism in a compressed position.
Figure 11:
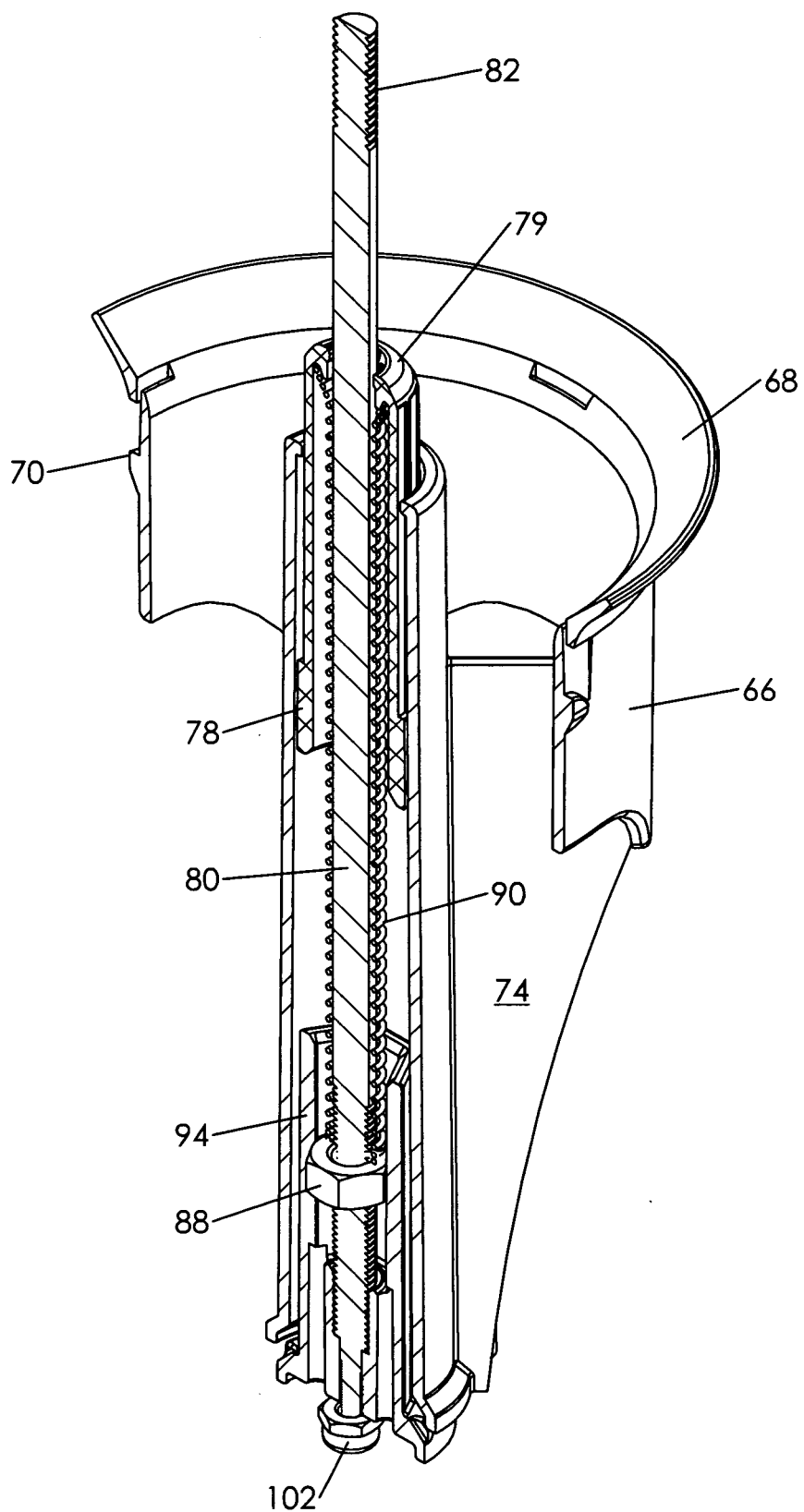
FIG. 11 is a view similar to FIG. 10 when the spring is a non compressed position.
Figure 12:
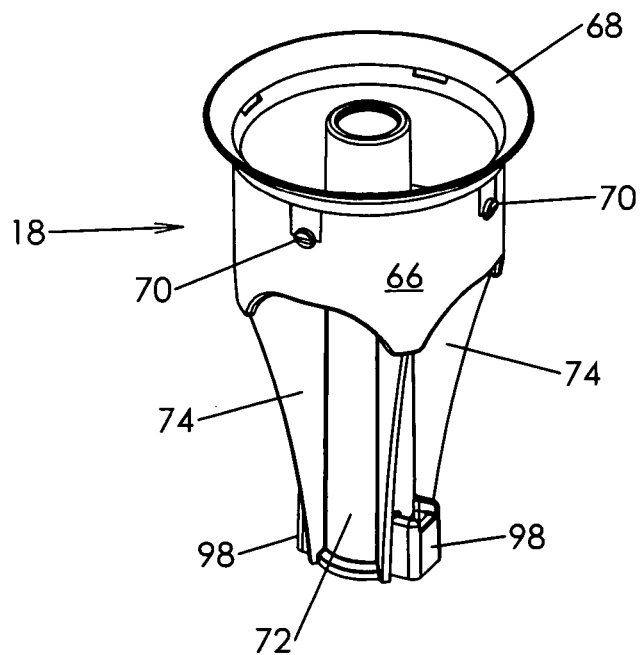
FIG. 12 is an exploded view of the central portion of the bird feeder.
Figure 12:
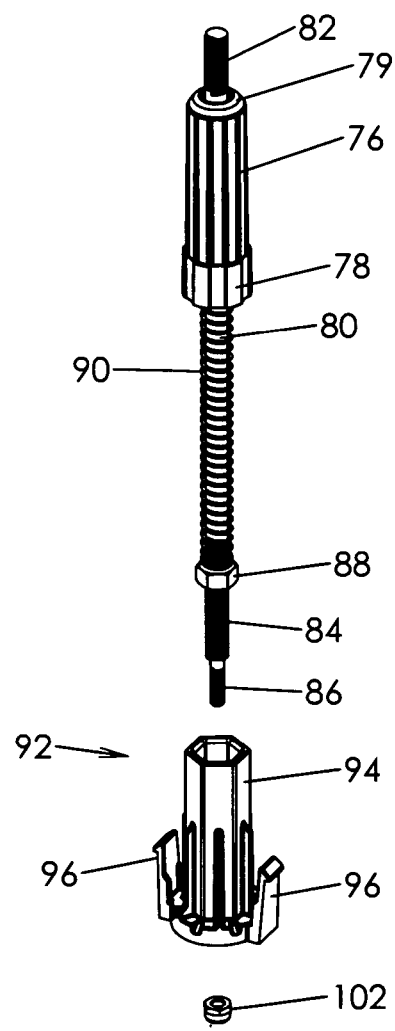

The feeder of the present invention may be used with an optional stand generally designated by reference numeral 134. As may be seen in the drawings, stand 134 includes a base portion 136 and a side wall 138. Formed within side wall 138 are a plurality of tab sections 140 each having a projection 142 thereon. An indicator 144 shows the user to push on the tab section to lock/unlock the same from connection with seed container 12. A shoulder 146 allows for resting of seed tray 14 thereon as may be seen in FIG. 4.

It will be understood that the above described embodiments are for purposes of illustration only and that changes and modifications may be made thereto without departing from the spirit and scope of the invention.

I claim:

1. A squirrel proof bird feeder comprising:
a seed container;
a seed tray located below said seed container so as to receive seeds from said seed container;
a shroud extending about said seed tray;
a cover attached to said shroud;
an upper ring housing secured to an upper end of said seed container, said upper ring housing having a central portion located within said seed container, a rod located within said central portion, said rod having a first end secured to said central portion, a second end of said rod extending through said cover for hanging said bird feeder; and
a compression spring extending about said rod, said compression spring having a lower end biased against a lower stopper and an upper end biased against an upper stopper, the arrangement being such that a predetermined weight on said shroud will compress said spring and said shroud will move downwardly.

2. The bird feeder of claim 1 wherein said shroud comprises vertical wires and horizontal wire loops attached thereto, the wire loops being spaced further apart remote from said seed container while providing feeding apertures adjacent said seed tube when said spring is not under a compressive force.

3. The bird feeder of claim 1 wherein said seed tray has a plurality of apertures to permit drainage thereof.

4. The bird feeder of claim 1 wherein said lower stopper comprises a nut screwthreadedly engaged with said rod to permit adjustment of said predetermined weight.

5. The bird feeder of claim 4 further including a nut to inactivate said adjustment nut.

6. The bird feeder of claim 1 further including a base upon which said bird feeder can sit, said base being funnel shaped such that upon removal, it will permit funnelling of seeds therethrough into said seed tube.

7. The bird feeder of claim 1 wherein said seed container comprises a cylindrical seed tube.

8. The bird feeder of claim 7 wherein said cylindrical seed tube has a pair of apertures formed therein proximate an upper end thereof, said upper ring housing having first and second projections formed on an outer wall surface, said first and second projections engaging with a respective one of said apertures.

9. The bird feeder of claim 8 wherein said projections have a tapered surface.

10. The bird feeder of claim 1 wherein said lower stopper comprises a nut, said rod having screwthreads thereon such that a compression force of said compression spring can be adjusted.

11. The bird feeder of claim 10 wherein said compression force is factory adjusted to a desired value.

12. The bird feeder of claim 1 further including a stand, said stand supporting said seed tray to allow for movement of said shroud.

13. The bird feeder of claim 12 wherein said stand has a funnel configuration and is sized at one end to fit within said seed container.

* * * * *